United States Patent [19]

Gilmor

[11] Patent Number: 4,483,307

[45] Date of Patent: Nov. 20, 1984

[54] FUEL VAPORIZATION DEVICE FOR INTERNAL COMBUSTION ENGINE

[76] Inventor: James E. Gilmor, 5524 Tucson St., Denver, Colo. 80239

[21] Appl. No.: 404,518

[22] Filed: Aug. 2, 1982

[51] Int. Cl.³ .............................................. F02M 31/00
[52] U.S. Cl. .................................... 123/558; 123/557; 261/DIG. 83
[58] Field of Search ............... 123/557, 483, 558, 522, 123/523, 524; 261/DIG. 83; 418/60, 61, 63

[56] References Cited

U.S. PATENT DOCUMENTS

| | | |
|---|---|---|
| 1,806,581 | 5/1931 | Bethenod . |
| 2,229,452 | 1/1941 | Hammer et al. . |
| 2,635,553 | 4/1953 | Gordenier ............................. 418/60 |
| 3,171,467 | 3/1965 | Featherson . |
| 3,227,427 | 1/1966 | Wells ......................... 261/DIG. 83 |
| 3,433,608 | 3/1969 | Epifanio, Sr. . |
| 3,630,698 | 12/1971 | Baldwin . |
| 4,003,356 | 1/1977 | Naylor ................................. 123/557 |
| 4,005,951 | 2/1977 | Swinkeis ................................ 123/63 |
| 4,040,403 | 8/1977 | Rose et al. . |
| 4,058,709 | 11/1977 | Long .................................... 123/483 |
| 4,151,821 | 5/1979 | Wichman ............................. 123/557 |
| 4,175,525 | 11/1979 | Johnson . |
| 4,342,303 | 8/1982 | McLord .............................. 123/557 |
| 4,343,283 | 8/1982 | Shepherd ............................. 123/557 |
| 4,395,995 | 8/1983 | Crain ................................... 123/557 |

FOREIGN PATENT DOCUMENTS

146294 11/1918 Japan ..................................... 123/61

Primary Examiner—Ronald H. Lazarus
Attorney, Agent, or Firm—Fields, Lewis, Pittenger & Rost

[57] ABSTRACT

A device for vaporizing liquid fuel for increasing burn efficiency within an internal combustion engine has been provided. Fuel is injected by means of a fuel injector (I) in timed sequence without the presence of air into a closed vacuum chamber (C) wherein the droplets of fuel are immediately changed to gaseous form. A pressurized oil lubrication system lubricates the piston walls and provides a vapor barrier within a rolling piston vacuum pump (P). Heat exchange means (H,H') are provided to maintain the temperature of the gaseous fuel substantially constant and at a lower vapor point to minimize recondensation as it is supplied to the intake manifold of the internal combustion engine. Control means (U) are provided to adjust both the frequency and duration of the injection liquid fuel droplets into the vacuum chamber (C).

10 Claims, 9 Drawing Figures

FUEL VAPORIZATION DEVICE FOR INTERNAL COMBUSTION ENGINE

TECHNICAL FIELD

This invention relates to a device for converting liquid fuel to gaseous fuel prior to introduction into an intake manifold of an internal combustion engine. More particularly, the invention relates to injection of liquid fuel droplets into a heated vacuum chamber within a closed vacuum system wherein the fuel droplets are converted to gaseous fuel which is conveyed at a substantially constant temperature to the manifold. A heat exchanger is utilized with the vacuum chamber and the remainder of the gaseous fuel path to the manifold wherein cooling liquid from the engine block of the internal combustion engine is brought into heat exchange relationship with the gaseous fuel to maintain the gaseous fuel at a substantially constant temperature.

BACKGROUND ART

It is well understood that the greater the vaporization or gasification of liquid fuel that can be accomplished the greater the surface area of the fuel which is subject to oxidation and therefore the higher the rate of combustion. In other words, the greater the percentage of the fuel that can be burned, the more efficient the operation of the engine. Attempts to completely gasify liquid hydrocarbon fuel go back many years. However, all of these attempts have had significant shortcomings. In some instances, the devices did not completely vaporize the fuel and therefore the expected increase in efficiency did not materialize. In other cases, the devices were of such a complex nature as to negate any real benefit from them or require such high power inputs themselves that even though a greater fuel efficiency was realized, the increased power needs negated this benefit.

It is elementary that in order to maximize the combustion of fuels it is necessary to bring as much of that fuel as possible into close proximity with oxygen. The only portion of a droplet of fuel which can be oxidized is the surface area. Therefore, the smaller the droplets the greater the total percentage of fuel which can be burned or oxidized. Thus, to increase oxidation it is necessary to increase vaporization. All present commercially successful carburetion systems attempt to vaporize liquid fuel prior to introduction into the manifold of the engine. While this is possible to some extent, the variation in fuel droplet size at the intakes to the carburetor can vary substantially and in fact a relatively low percentage of the total fuel is actually oxidized and burned when supplied through a standard carburetor.

The ultimate carburetion system would be one that feeds fuel to the manifold in a pre-vaporized or gaseous form and particularly one in which all liquid fuel is converted to a gaseous fuel prior to engering the manifold and the cylinders of the engine. The known prior art devices have fallen short in several respects in accomplishing this end.

For instance, one of the most noted prior art devices which was developed by Charles Nelson Pogue in the 1930's was a carburetor for the vaporization of gasoline which has been widely advertised as the two hundred mile per gallon carburetor. This device has never enjoyed wide commercial success because it is nearly as large and cumbersome as the engine it is meant to fuel and it requires an operating temperature which approaches the flash point of fuel, such as gasoline. Therefore, the safety of the passengers in the vehicle in which the carburetor is used may be in jeopardy as well as those who are near the vehicle. In other words, the potential for an explosion is quite great.

A device for vaporizing fuel, such as diesel fuel is disclosed in U.S. Pat. No. 1,806,581 to Bethenod for "Fuel Supply System For Internal Combustion Engines of Variable Load For Using Heavy Fuels". The diesel fuel is supplied through a conventional gasoline carburetor and air is drawn through an intake by means of a vacuum pump. This system is an open system, i.e., air in large quantities is continuously drawn in from the atmosphere by a first vacuum pump. A second vacuum pump is intended to pull a vacuum on the air-fuel mixture in a reservoir to vaporize the fuel whereupon it is fed into a manifold of an engine which is supplied with still an additional air intake. Heat exchange means are provided around the reservoir and again near the intake manifold to minimize fluctuations in fuel temperature. Because the system is open, large quantities of air are drawn through it making it very difficult to draw a sufficient vacuum to substantially vaporize any fuel which was not vaporized directly by the carburetor. In other words, for such a device to operate effectively it would be necessary to provide such a huge vacuum pump that the fuel savings, if any, would be negligible. Alternatively, with a smaller vacuum pump the fuel is not properly vaporized in an open system wherein atmospheric air is constantly being drawn into the system.

Another device for providing gaseous fuel to the carburetor of an internal combustion engine is shown in U.S. Pat. No. 3,630,698 to Joseph H. Baldwin for "Fuel System". In this device, gaseous vapors are drawn from a vacuum chamber by means of a manifold vacuum. The vacuum chamber contains a supply of liquid fuel which is replenished through a float valve. Two potential problems are associated with this type of device. First, the vacuum from the manifold may not be sufficient under certain load conditions to provide sufficient fuel to the engine. Second, by drawing the gaseous vapors off a body of liquid gasoline the lighter hydrocarbons are boiled off first, leaving a relatively heavy liquid hydrocarbon, frequently referred to as "strip oil". Therefore, in order to keep the system working properly, means must be provided to regularly withdraw the strip oil and replace it with fresh gasoline.

Another device for vaporizing gasoline is disclosed in U.S. Pat. No. 4,040,403 to Rose, et al for "Air-Fuel Mixture Control System". In this device, fuel is supplied to a vaporizer wherein the level of the liquid fuel in the vaporizer is controlled by a float valve. Hot exhaust gases from the engine are boiled through the liquid gasoline causing a portion of it to be vaporized and carried to the engine. The device includes a complex amplifying system for adjusting the air-fuel mixture and a separator for taking out any fuel droplets from the fuel as it is vaporized in the vaporizer. With this device, the lighter hydrocarbons will be vaporized leaving behind the heavier hydrocarbons or strip oil.

U.S. Pat. No. 4,175,525 to Johnson for "Fuel Vaporizer System For Internal Combustion Engines" discloses a sealed vaporization system connected between a fuel supply line and the intake manifold of an internal combustion engine and operated in parallel with a carburetor. A float valve is provided in this device to control the flow of liquid fuel to a chamber wherein it is vaporized and fed to a carburetor. The lighter hydrocarbons will be boiled off of the liquid fuel before the heavier hydrocarbons leaving strip oil in the chamber.

Another difficulty with prior art devices utilized to vaporize fuel is that no adequate provision has been provided for lubricating the walls of the piston of the vacuum pump. Thus, in many attempts to make such a vaporization system, the piston would "freeze" to the side walls of the cylinder. Attempts have been made to interject oil into the fuel, but this oil then was injected into the engine with the fuel vapor mixture causing unburned hydrocarbons from the oil and resulting in residue which was damaging to the engine.

DISCLOSURE OF THE INVENTION

In accordance with this invention, a fuel vaporization device for supplying gaseous fuel to an intake manifold for an internal combustion engine is provided. The device includes a vacuum chamber closed to atmosphere and having an inlet and an outlet and a means for injecting liquid fuel without air in the form of atomized droplets into the vacuum chamber through the inlet at a predetermined volume and rate. A vacuum pump having an inlet and an outlet is connected through its inlet to the outlet of the vacuum chamber to draw a substantial vacuum in the vacuum chamber to vaporize the liquid fuel droplets into a gaseous state as the droplets are injected into the vacuum chamber thereby maximizing the vaporization of all liquid fuel injected into the vacuum chamber. The gaseous fuel is then supplied by a suitable means to the intake manifold connected to the outlet of the vacuum pump. The device constitutes a closed system which is not open to the atmosphere at any point along the path from the injecting means to the manifold.

More particularly, the invention contemplates supplying liquid gasoline or other hydrocarbon fuel to a vacuum chamber by means of a fuel injector which will inject liquid fuel droplets at a volume and rate determined by engine demand. A very high vacuum is drawn on the vacuum chamber by means of a rotary piston vacuum pump in this closed system so that the fuel droplets injected by the fuel injector into the vacuum chamber are immediately vaporized. The vaporized fuel is then pumped by the vacuum pump to the intake manifold of the engine substantially at manifold pressure.

Conveniently, a heat exchanger is provided which supplies heat from the liquid coolant of the engine in heat exchange relationship with the vacuum chamber, vacuum pump, and fuel supply lines to maintain the vaporized fuel at a substantially constant temperature. This heat lowers the vapor point within the vacuum chamber and the rest of the system to enhance vaporization in the vacuum chamber and to minimize recondensation within the rest of the system.

Advantageously, the rolling piston vacuum pump of this invention is provided with a source of lubricating oil under pressure which is injected into a bearing at one end of the pump and passes through the bearing and by suitable passageways to the vanes of the pump. The oil moves along the surface of the vanes to the surface of the rolling pistons thereby applying a thin film of oil to the surface of the pistons. This oil serves the dual function of lubricating the piston walls and providing a seal between the piston and the piston walls with the respective vanes. Excess oil passes into the bearing at the opposite end of the pump by means of a suitable passageway provided for this purpose.

A fuel control unit is connected to the fuel injector for controlling the frequency and volume of liquid fuel injected into the vacuum chamber in response to functions of the internal combustion engine. One such fuel control unit has an adjustable frequency selector circuit for activating the fuel injector after a predetermined number of firings of the engine coil and a variable pulsewidth selecting circuit to vary the length of time during which the fuel injector is actuated.

Thus, it can be seen that a simple device for enhancing vaporization of liquid hydrocarbon fuel for an internal combustion engine has been provided. This is accomplished by injecting droplets of liquid fuel by means of a fuel injector into a vacuum chamber into which a substantial vacuum is drawn so that the fuel droplets are vaporized and supplied in vaporized state to the intake manifold of the engine at substantially constant temperature. This results in increased efficiency in the combustion of the fuel, thereby maximizing the fuel mileage obtained.

The term "fuel" as used herein is intended to include gasoline, propane, butane, alcohol and any other relatively volatile hydrocarbon used to run an internal combustion engine.

The term 37 internal combustion engine" is intended to include all reciprocal piston engines, turbine engines and rotary engines, etc.

Additional advantages of this invention will become apparent from the description which follows taken in conjunction with the accompanying drawings.

BEST MODE FOR CARRYING OUT THE INVENTION

Figure 1:
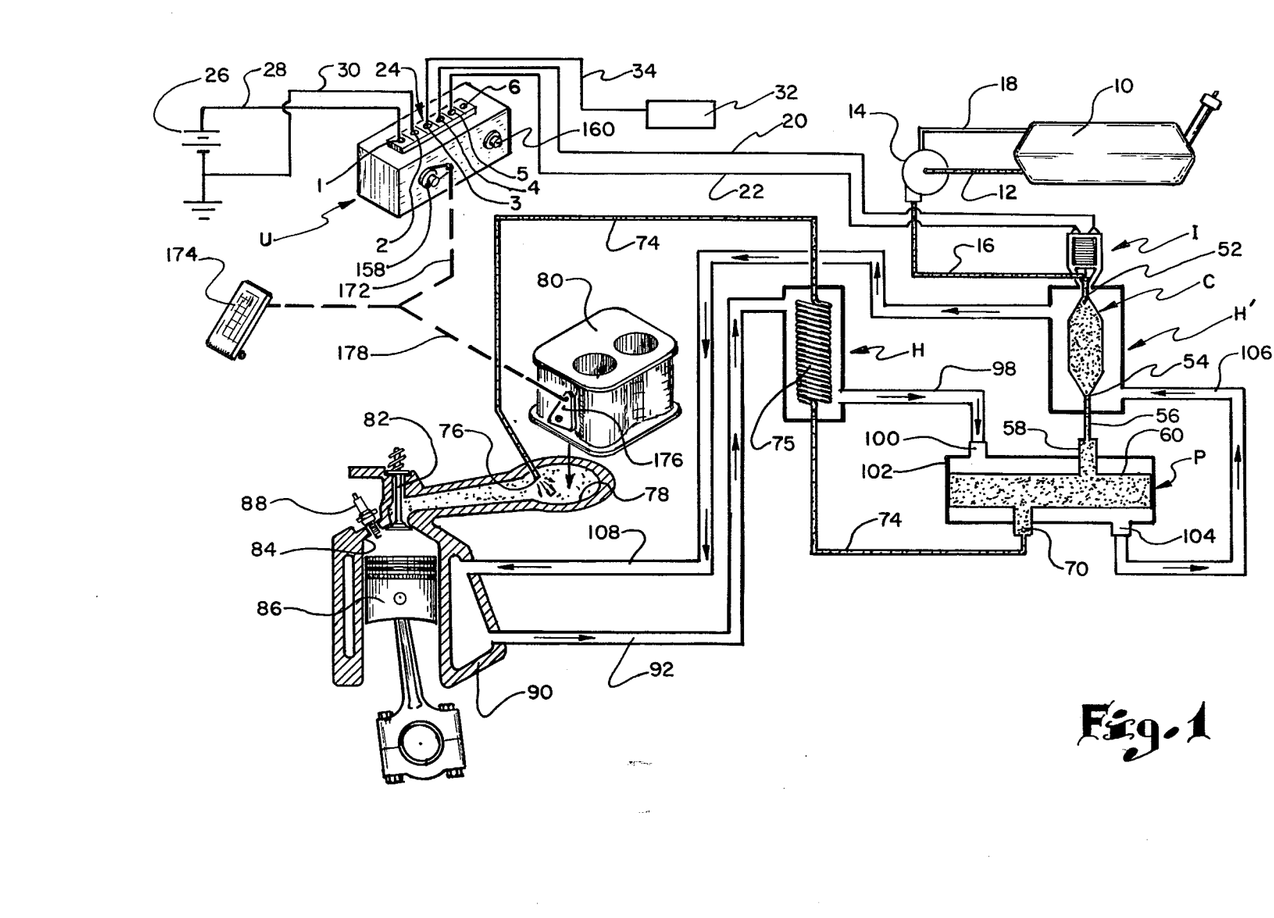
FIG. 1 is a diagrammatic illustration of a fuel vaporization device constructed in accordance with this invention.

In accordance with this invention, liquid fuel is pumped from a fuel tank 10 through a fuel line 12 by a fuel pump 14. The fuel pump may be a conventional electric fuel pump of the type used in the automotive industry. The pump supplies liquid fuel through a fuel line 16 to fuel injector I. Any excess fuel not required by fuel injector I is returned to gas tank 10 through an overlow line 18 from fuel pump 14.

Fuel injector I is energized by power supplied from electronic fuel control unit U through lines 20 and 22 connected to a terminal strip 24 which has six contact points 1-6. Contact points 1-5 are connected in a manner described below. Contact point 6 is not used. Power is supplied to the electronic fuel control unit by means of a battery 26 connected to terminal strip 24 through lines 28 and 30, as shown. The coil 32 associated with the internal combustion engine is also connected to terminal strip 24 as by a line 34. The signal from the coil is indicative of the speed of the engine and therefore provides a control for the frequency of energization of fuel injector I, all in a manner more fully described below.

Figure 2:
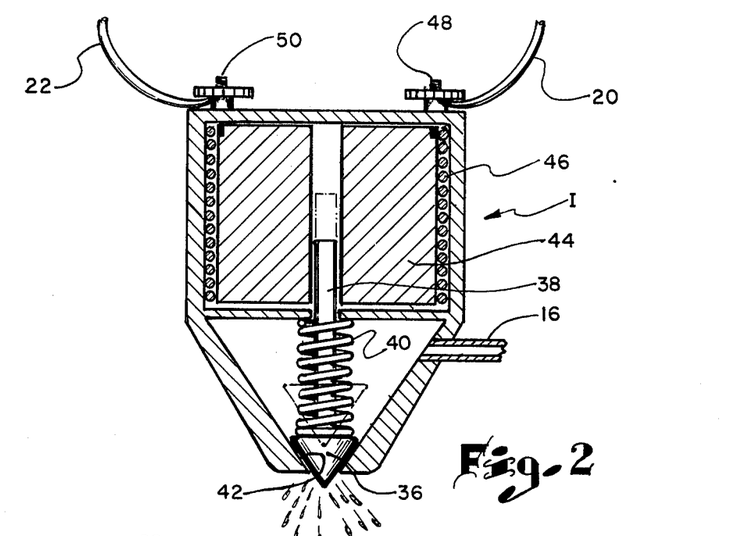
FIG. 2 is an enlarged vertical section, showing details of the fuel injector of FIG. 1.

As best seen in FIG. 2, the electric, solenoid-operated injector valve has a conical valve seat 36 connected to a plunger 38 and urged into closed position by spring 40 against valve opening 42. The plunger is made of soft iron and is slidable received in a solenoid core 44 around which a coil 46 is wound. This coil is connected to terminals 48 and 50 to which wires 20 and 22 are respectively connected. When coil 46 is energized, plunger 38 is pulled into the solenoid thereby forming an opening between the slanted surfaces of valve seat 36 and valve opening 42 which releases atomized droplets or pressurized fuel supplied under pressure from fuel pump 14. When coil 46 is de-energized, spring 40 returns the conical valve seat 36 to its closed position against the sloping surface of valve opening 42. The frequency and duration of the solenoid action are variables that can be controlled by adjustment of the controls for the electronic fuel control unit U in response to engine load as explained more fully below.

The valve opening or outlet 42 of fuel injector I is connected to an inlet 52 of vacuum chamber C, as shown in FIG. 1. The vacuum chamber in turn has an outlet 54 connected by a fuel line 56 to vacuum pump P. The vacuum pump P draws a very high vacuum, such as on the order of 22 to 25 inches of mercury on alcohol fuel and 25 to 27 inches of mercury on gasoline fuel at sea level, on vacuum chamber C so that when the fuel droplets are injected by fuel injector I into vacuum chamber C they are rapidly and substantially completely converted from a liquid to a gas. The optimum vacuum to obtain substantially complete vaporization of the fuel has been found to be 24 inches of mercury for alcohol and 26 inches of mercury for gasoline. These high vacuums can be drawn because the system is closed, i.e., no air is admitted into the vacuum chamber. The vacuum chamber has no communication with atmospheric air pressure. This permits the use of a vacuum pump of practical size and power requirements not heretofore possible.

Any vacuum pump which can draw the aforementioned vacuum levels will be satisfactory. One pump which has been found to be particularly satisfactory is a rolling piston pump such as Model No. SA439 manufactured by Mitsubishi Electric Corporation of Tokyo, Japan and sold through Mitsubishi Electric Sales America, Inc., 3247 West Story Road, Irving, Tex. 75062. Also, a turbine pump can be used.

Figure 3:
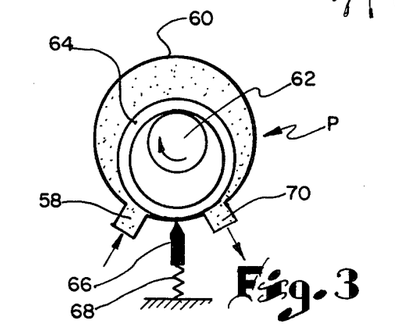
FIGS. 3-6 are diagrammatic illustrations of the sequential operation of a rolling piston vacuum pump as utilized in the device shown in FIG. 1.
Figure 4:
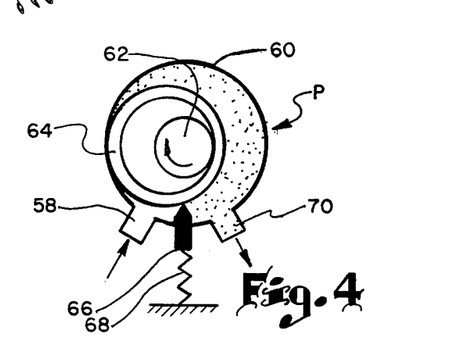
Figure 5:
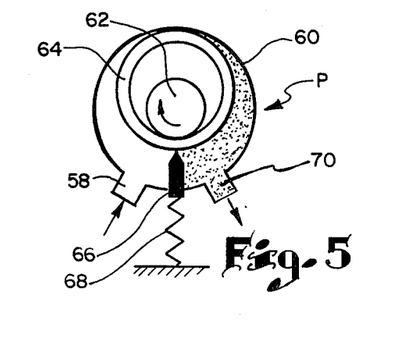
Figure 6:
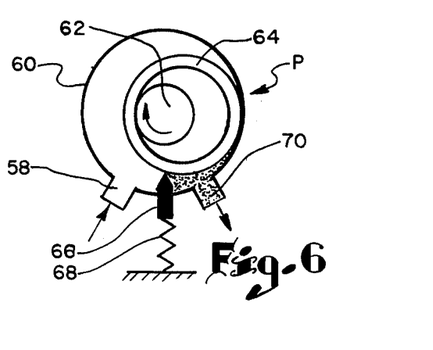
Figure 7:
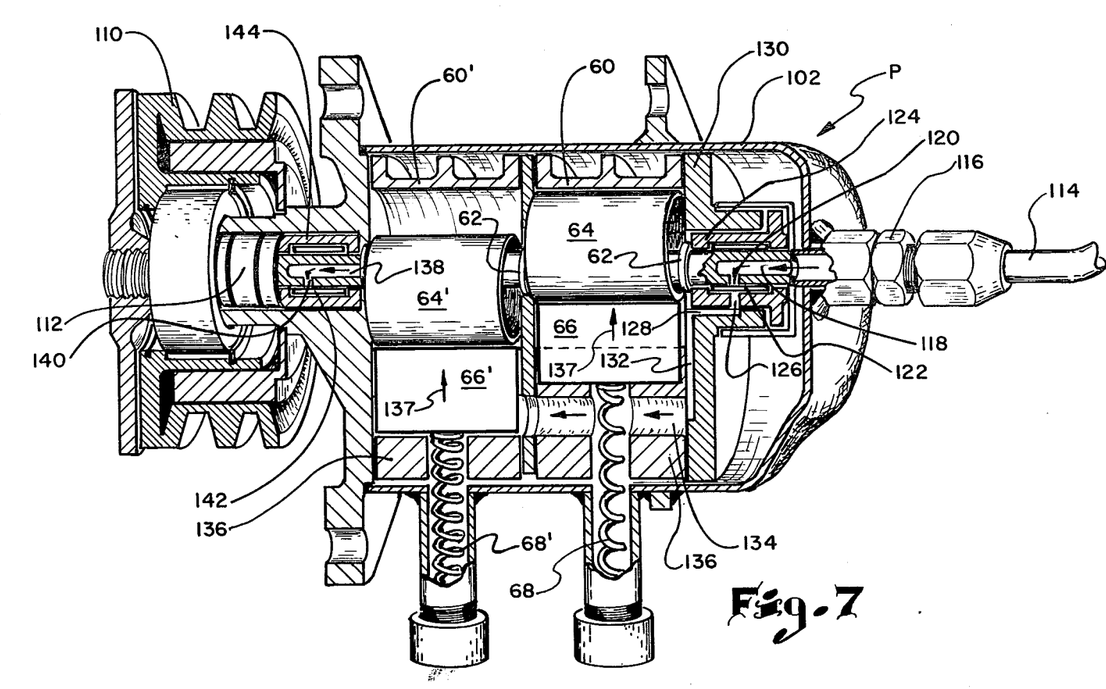
FIG. 7 is an enlarged longitudinal vertical section through the vacuum pump of FIG. 1, showing further details thereof, including the pressurized oil lubrication system of this invention.

A cross section of the rolling piston pump is shown in FIG. 7. The operation of such a pump is diagrammatically shown in FIGS. 3–6. The gaseous fuel is drawn into pump P through inlet port 58 due to the vacuum or subatmospheric pressure created by the pump. The pump consists of an outer cylinder 60, a central crank shaft 62 to which a rolling piston 64 is fixedly attached for rotation with the crank shaft. The rolling piston together with a vane 66 which is urged against the surface of piston 64 by a spring 68 divides cylinder 60 into two chambers, namely a vacuum chamber into which gaseous fuel is drawn and a compression chamber which compresses the gaseous fuel and discharges it through outlet 70. It will be understood that even in the compression chamber, the pressure will be very low, even below atmospheric pressure. It is only important that it be above the engine manifold pressure to induce flow of the gaseous fuel from the compression chamber to the manifold. Thus, as the rolling piston 64 rolls from the position shown in FIG. 3 to the position shown in FIG. 4 it will temporarily close inlet 58 and begin compressing the gaseous fuel which is ahead of the piston. When the piston reaches the position of FIG. 4, inlet 58 will again be open and fuel will enter into the space between piston 64 and vane 66. As the piston 64 continues to roll from the position shown in FIG. 4 to the position shown in FIG. 5, the gaseous fuel ahead of the piston will be compressed and additional fuel will be drawn into the pump by the vacuum created behind piston 64. On the other hand, the fuel ahead of piston 64 continues to be compressed and to flow through outlet 70 as the piston rolls from the position shown in FIG. 5 to that shown in FIG. 6. The fuel pressure will increase because of the restriction of outlet 70 and can vary from subatmospheric pressure to a pressure of about two atmospheres. The gaseous fuel then is drawn to the intake manifold of the engine by the manifold vacuum.

The fuel may be supplied to the engine through fuel line 74, shown in FIG. 1, which terminates in a nozzle 76 in intake manifold 78 of the engine. Advantageously, nozzle 76 is located adjacent conventional carburetor 80 which supplies fuel to the engine during warm up and regulates air flow to the manifold as described more fully below. The fuel-air mixture is then supplied through intake valve 82 to cylinder 84 in which piston 86 reciprocates to burn the fuel upon ignition of spark plug 88 as is well known in the art. Although only one cylinder has been shown, it will be understood that the engine may have multiple cylinders.

Conveniently, a heat exchange system is provided for maintaining the gaseous fuel at substantially constant temperature whereby the cooling fluid from the motor block 90 is used as a heat transfer medium. In this regard, a supply tube 92 carries heated cooling fluid from motor block 90 to a first heat exchanger H surrounding a heat exchange portion 75 of fuel line 74, as shown. It will be understood that FIG. 1 is a diagrammatic illustration and that heat exchanger H could be made to surround all or substantially all of fuel line 74 as required to maintain the gaseous fuel at a substantially constant temperature. The purpose of the heat exchanger is to maintain the temperature of the gaseous fuel at a relatively high temperature of between 160° F. and 200° F. A temperature of about 180° F. has been found to be very satisfactory. By raising the temperature of the gaseous fuel, the vapor point of the fuel is lowered thereby minimizing the possibility that the fuel will condense in fuel line 74. The coolant from the engine then goes through tube 98 to an inlet 100 of a heat exchanger 102 forming part of rolling piston pump P and surrounding chamber 60 therein. The motor coolant then passes through an outlet 104 and through tube 106 to a second heat exchanger H' surrounding vacuum chamber C. Heat exchanger H' is very important in keeping vacuum chamber C heated since the expansion of the liquid fuel from fuel droplets injected by fuel injector I into the vacuum chamber will have a cooling effect as they expand. By maintaining the temperature of the vacuum chamber at a level approximating that of the heated cooling fluid from the motor block 90, the vaporization point of the liquid fuel droplets will be lowered, enhancing vaporization. Furthermore, recondensation of the gaseous fuel, as previously discussed, will be minimized. The cooling fluid then passes from the heat exchanger H' through a return tube 108 and back into motor block 90 where it is again heated by the engine. The temperature of the gaseous fuel should be kept in the range of 160° F. to 200° F. with a temperature of about 180° F. being desirable. It will be understood that the various elements of this invention may be located in closer proximity so that one heat exchange jacket is all that will be required or separate ones may be used for the separate elements as space and location of engine parts dictate as will be apparent to one skilled in the art.

While a heat exchange system utilizing liquid engine coolant has been described, it should be understood that other heat exchange media can be used, such as electricity or vehicle exhaust.

Turning now to FIG. 7, a cross section of pump P is shown. This pump can be driven through pulley 110 mounted on drive shaft 112, which in turn is connected to crank shaft 62. The pulley will be driven in the conventional manner such as by a v-belt (not shown) extending from pulley 110 to a drive pulley on the internal combustion engine. In order to provide sufficient capacity, pump P is shown as having two rolling pistons 64 and 64' eccentrically mounted on opposite sides of crank shaft 62 and rotatable about the walls of cylinder 60 and 60', respectively. Vanes 66 and 66' are urged against the bottom of pistons 64 and 64' by springs 68 and 68', respectively, to divide the respective cylinders into two chambers as previously described. The two pistons work in parallel in creating the vacuum in vacuum chamber C.

Means are provided for lubricating the piston walls and cylinder walls under pressure which includes an oil pressure line 114 from a source of oil (not shown) which is connected to an oil pressure fitting 116 connected to the end of housing 102 surrounding the operative portions of the pump and serving as a heat exchange, as previously described. The pressure fitting 116 is connected by a passageway 118 in one end of crank shaft 62, as shown. The oil passes through this passageway to a port 120 extending at right angles through the side wall of crank shaft 62. The oil then passes through races 122 in a roller bearing 124 which supports the end of crank shaft 62. After lubricating roller bearing 124, the oil passes through another port 126 in the roller bearing and into a lateral groove 128 in bearing support 130 and then along a radial groove 132 to a transverse passageway 134 extending through vane guides 136 and 136'. The flow of oil is clearly shown by the arrows 137 in FIG. 7. The oil coats the surfaces of the vanes and passes along the surface to the walls of pistons 64 and 64', respectively. The oil coats these surfaces and provides a seal between the vane and the pistons as well as the pistons and the walls of cylinders 60 and 60', respectively, maintaining the appropriate vacuum levels in the cylinder on opposite sides of the vanes, all as previously described. Any excess oil passes through a passageway 138 in drive shaft 112 and through a port 140 to lubricate races 142 of roller bearing 144.

Thus, the pressurized lubrication system shown in the rolling piston pump P of FIG. 7 provides a dual function. First, it lubricates the cylinder walls and piston walls, as required. Also, it forms a seal between the cylinder walls and piston walls to maintain a differential pressure required within the cylinders as required on opposite sides of the vanes.

Figure 8:
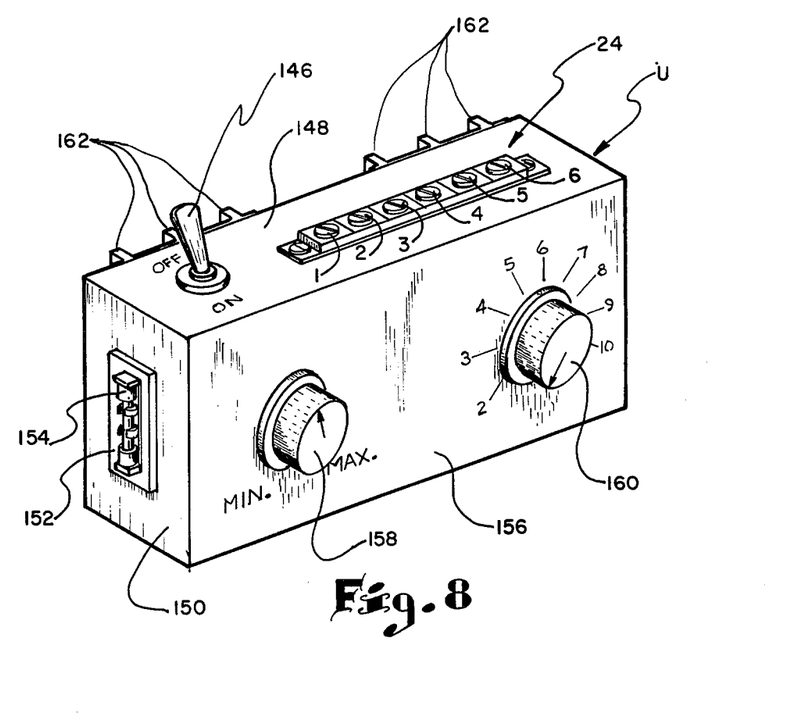
FIG. 8 is an enlarged perspective view of the electronic fuel control unit shown in FIG. 1.
Figure 9:
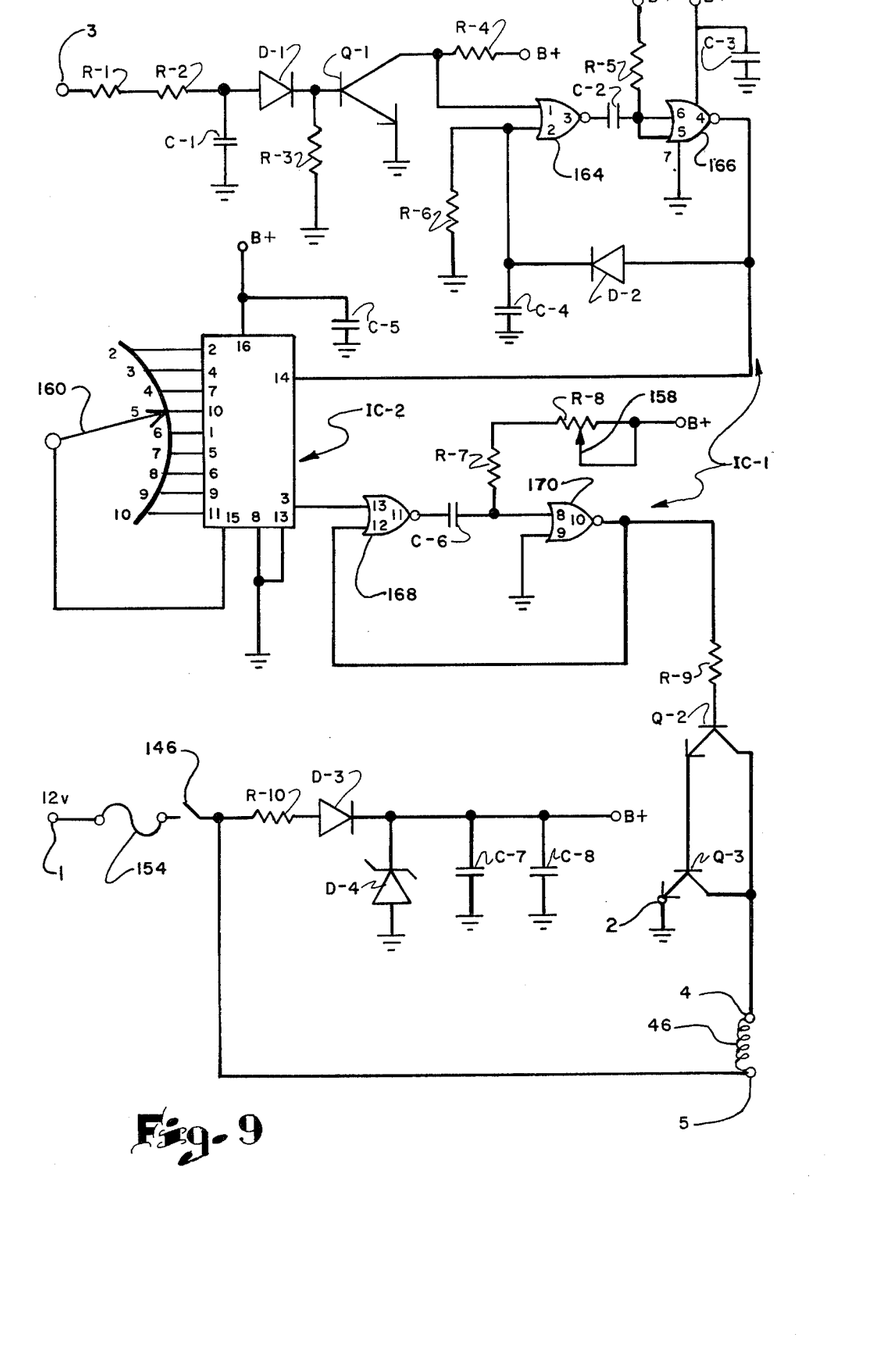
FIG. 9 is a circuit diagram of the electronic fuel control unit of FIG. 8.

The external components of the electronic fuel control unit U are illustrated in FIG. 8 whereas the circuitry therefor is shown best in FIG. 9. The unit is turned on and off by a toggle switch 146 on top panel 148. Contact strip 24 is also located on top panel 148 and is connected electrically as previously described with respect to FIG. 1. Mounted on the left end panel 150 is a fuse holder 152 in which a fuse, such as a ten ampere fuse 154, may be placed. On the front panel 156 at the left hand side is a potentiometer 158 which controls the duration of the fuel injection from a minimum of 0.3 milliseconds to a maximum of 10 milliseconds, all as will be more fully described below. On the right hand side of front panel 156 is a twelve position rotary switch 160 in which positions 2–10 represent the number of firings of the coil which will produce one fuel injection. Switch positions 1, 11 and 12 are not used. A heat sink 162 is provided on the back panel for dissipating the heat from the unit.

Now the details of the electronic fuel control unit will be described with particular reference to FIG. 9. Typically, voltage released from the point side of coil 32 will have an amplitude of 50 volts peak-to-peak in the shape of a square wave with a ringing on the positive side of the pulse of about nine rings. The square wave enters the electronic fuel control unit by a contact point 3 of the six contact point terminal strip 24. From here the pulse travels through integrated circuit IC-1. This pulse in integrated circuit IC-1 first passes through resistors R-1 and R-2. This reduces the high voltage from the coil pulse to about ½ volt, an acceptable level for rectifier diode D-1. In addition, high frequency capacitor C-1 filters some of the high frequency ripple to ground. Resistor R-3 taps additional irregularities from the remaining voltage.

Integrated circuit IC-1 includes four NOR gates. The first two gates 164, 166 which comprise the core of the filtering network and the first half of integrated circuit IC-1, are used as a monostable multivibrator. The other two gates 168, 170 are the second half of integrated circuit IC-1 and are used as a monostable multivibrator with variable pulse width and serve as a pulse width selecting network.

The pulse from diode D-1 enters transistor Q-1 which acts as a saturated switch in that it is either "ON" or "OFF". Thus, it either shorts the output voltage to ground or opens up and allows B+ from battery 26 to flow to the output and pin 1 of NOR gate 164. Thus, the ringing square wave has now been replaced by a filtered square wave to trigger NOR gate 164 at pin 1.

NOR gate 164 acts as a one shot, in that it produces one output pulse for one input pulse. The gate is designed as a NOR gate so any high input voltage on either pin 1 or pin 2 produces a low output voltage on pin 3. Only if both input voltages on pins 1 and 2 are low, will a high output voltage on pin 3 exist. Because the positive input pulse is high, having been held at 10 volts by B+, through the "OFF" action of transistor Q-1, the output at pin 3 is low. This bleeds off the pin 3 side of capacitor C-2 through pin 3 and resistor R-6.

When a positive pulse enters transistor Q-1, it causes this transistor to conduct, shorting pin 1 of NOR gate 164 to ground. With pin 1 low, pin 3 will be high, causing the left side of capacitor C-2 to be high and inducing a negative potential on the right side of capacitor C-2. This, in turn, causes a negative potential or low condition on pins 5 and 6 of NOR gate 166 thus producing a positive pulse on pin 4. B+ is fed into integrated circuit IC-1 by pin 4. A capacitor C-3 filters out random noises.

The positive output pulse from pin 4 then goes from the first half of integrated circuit IC-1 to integrated circuit IC-2 through pin 14. It also goes back over diode D-2 which keeps pin 3 of NOR gate 164 low by keeping pin 2 high. Integrated circuits IC-1 and IC-2 will function over a wide voltage range such as from 5 to 18 volts. This is significant since the automobile may be producing 14 volts or more with the alternator charging. Integrated circuit IC-1 has a high input impedence so that it does not load down the previous circuitry such as transistor Q-1.

Part of a safety feature which eliminates the chance of premature overlapping firings of pin 4, is the return of the pin 4 output over diode D-2 to pin 2 on NOR gate 164. The positive pulse from pin 4 locks pin 2 in a positive condition. As pin 2 goes positive, pin 3 goes negative and remains negative. It cannot be triggered by pin 1 until pin 2 bleeds off through resistor R-6. When it does, pin 2 drops to 0 volts and any pulse of pin 1 can reactivate NOR gate 164 again. Therefore, there is no response by the monostable multivibrator to any incoming voltage until capacitor C-4, which was also charged by the feedback through diode D-2, bleeds down to ground through resistor R-6. This effectively filters out any ringing. The control of the time element during which new incoming pulse is effective in actuating the monostable multivibrator depends on the values in capacitors C-2 and C-4 and in the resistors R-5 and R-6.

Integrated circuit IC-2, which is the frequency selecting network, includes a variable stepping switch which resets every time the selected number of steps have been completed as indicated by the setting of rotary switch 160. Integrated circuit IC-2 is powered by B+ through pin 16 and filtered by capacitor C-5. This eliminates the effect of extraneous noises. The first pulse from pin 4 of NOR gate 166 continues to pin 3 of integrated circuit IC-2 directly from pin 14, and from there to the second half of integrated circuit, IC-1. However, every pulse thereafter is used as a trigger in a stepping circuit. This means that between resets, only one pulse eminates from pin 3 of integrated circuit IC-2 for every 2, 3, 4, 5, 6, 7, 8, 9, or 10 pulses entering integrated circuit IC-2, depending on the setting of rotary switch 160. Preferably, the setting of switch 110 will be done at the time of installation and will be set according to the characteristics of the automobile in which it is to be used. Typically, a larger engine will require a higher setting since its demand for fuel is greater.

As an example, if the pointer on rotary switch 160 is set on 8, the first pulse from pin 4 of NOR gate 166 would go through integrated circuit IC-2 and exit on pin 3 to travel to the second part of integrated circuit IC-1. Every pulse thereafter will advance the stepping action one step until it reaches step number 8 then it will reset and repeat the cycle. This results in one firing of the injector for every eight firings of the coil. This particular setting has been found satisfactory for an eight cylinder automobile. To accomplish this, the pin connections have been made as shown in FIG. 9.

The timed pulse is then led from the frequency selector network IC-2 to the second half of integrated circuit IC-1, the pulse width selecting network. This determines the length of time that the solenoid will be energized, thereby fixing the duration of each fuel injection cycle.

The output voltage from integrated circuit IC-2 is applied to pin 13 of NOR gate 168 and the second half of integrated circuit IC-1. As pin 13 becomes positive, pin 11 becomes negative. This causes the left side of capacitor C-6 to become negative. At the end of the pulse, when pin 13 becomes negative and pin 11 becomes positive, the right side of capacitor C-6 becomes negative. Since this signal is applied to pin 8 of NOR gate 170, this causes pin 10 to become positive. At the right side of capacitor C-6, B+ is supplied through resistor R-7 and control potentiometer 158 which includes a variable resistor R-8. The greater the effective resistance across R-8 due to the setting of potentiometer 158, the greater the duration of each injection. As shown in FIG. 1, potentiometer 158 can be controlled by a mechanical linkage 172 from the gas pedal 174. Also, a control arm 176 for the butterfly airintake control in carburetor 80 can be controlled from gas pedal 174 through linkage 178.

Referring back to FIG. 9, the pulse from pin 10 of NOR gate 170 passes through resistor R-9 to the base of transistor Q-2. This causes transistor Q-2 to turn on and to conduct between emitter and collector turning on transistor Q-3, which in turn conducts ground between the emitter and collector. This ground is transmitted to pin 4 of solenoid 44 whose other pin 5 is connected to a continuous 12 volt supply from automobile battery 26. This voltage is controlled by toggle switch 146 on the electronic fuel control unit U.

The 12 volt potential from the positive side of car battery 26 is supplied to contact pin 1 on terminal strip 24 on top panel 148 of the electronic fuel control unit U. From there, the connections permit the voltage to pass through fuse 154 and toggle switch 146. The voltage then passes to resistor R-10 and to a rectifying diode D-3. All of the other B+ contacts are in the internal circuitry. After leaving diode D-3, the voltage passes through a Zener diode D-4 to ground. This diode acts more or less as a voltage regulator draining any voltage in excess of 12 volts. This is necessary because the available voltage may go as high as 14 volts when the alternator is charging the car's battery. After passing through diode D-3, the voltage is also led into two capacitors, to ground taps, namely capacitor C-7 and capacitor C-8 which further stabilize the voltage. After passing switch 146, the B+ voltage also goes to connector pin 5 on terminal strip 24 and through external wire 22 to the fuel injector I.

From the foregoing, it should be clear that the internal wiring for the six contact point terminal strip 24 is connected so that contact point 1 connects to fuse 154. Contact point 2 connects to the emmiter of transmitter Q-3 and to all other ground connections. Contact point 3 connects to resistor R-1 input. Contact point 4 connects to the collector of transistor Q-3. Contact point 5 connects to toggle switch 146, and contact point 6 is open, i.e., it is not used.

To further assist in practicing this invention, parts lists are set forth below in Tables I, II, III, IV, V and VI for the parts of electronic fuel control unit U, described above.

ELECTRONIC FUEL CONTROL UNIT

TABLE I

Parts List - Resistors

| | OHMS | WATTS | TOLERANCE | TYPE | FUNCTION |
|---|---|---|---|---|---|
| R-1 | 47 k | 0.5 | 5% | Carbon film | Voltage divider |
| R-2 | 47 k | 0.5 | 5% | Carbon film | Voltage divider |
| R-3 | 33 k | 0.5 | 5% | Carbon film | Voltage divider |
| R-4 | 10 k | 0.5 | 5% | Carbon film | Pull up resistor |
| R-5 | 1 Meg | 0.5 | 5% | Carbon film | Pull up resistor |
| R-6 | 1 Meg | 0.5 | 5% | Carbon film | Pull down resistor |
| R-7 | 39 k | 0.5 | 5% | Carbon film | Limiting resistor |
| R-8 | 500 k | 0.5 | 5% | Carbon film | Potentiometer |
| R-9 | 1 k | 0.5 | 5% | Carbon film | Isolation resistor |
| R-10 | 22 | 1.0 | 5% | Carbon film | Voltage dropping resistor |

TABLE II

Parts List - Capacitors

| | VALUE | VOLTAGE | TOLERANCE | FUNCTION |
|---|---|---|---|---|
| C-1 | 0.001 uf | 50 volts | 10% | Filter |
| C-2 | 0.001 uf | 50 volts | 10% | Time constant determinant |
| C-3 | 0.047 uf | 50 volts | 10% | Filter |
| C-4 | 0.001 uf | 50 volts | 10% | Time constant determinant |
| C-5 | 0.047 uf | 50 volts | 10% | Filter |
| C-6 | 0.100 uf | 50 volts | 10% | Time constant determinant |
| C-7 | 0.001 uf | 50 volts | 10% | Filter |
| C-8 | 100 uf | 50 volts | +50%, −10% | Electrolytic filter |

TABLE III

Parts List - Diodes

| DIODE | TYPE | FUNCTION |
|---|---|---|
| D-1 | 1N914 | Rectifier |
| D-2 | 1N914 | Rectifier (only) |
| D-3 | 1N914 | Rectifier (only) |
| D-4 | 1N4742A, 12 v., ZENER | Voltage regulator |

TABLE IV

Parts List - Transistors

| TRANSISTOR | TYPE | FUNCTION |
|---|---|---|
| Q-1 | 2N3601 | Switch |
| Q-2 | 2SC1505 | Darlington switch |
| Q-3 | 2SD350 | Darlington switch |

TABLE V

Parts List - Integrated Circuits

| INTEGRATED CIRCUIT | TYPE | FUNCTION |
|---|---|---|
| IC-1 | CD4001 | Filter and width selector |
| IC-2 | CD4017 | Pulse frequency selector |

TABLE VI

Parts List - Miscellaneous

| MISC. | TYPE | FUNCTION |
|---|---|---|
| F-1, Fuse | 10 Ampere | Circuit protection |
| S-1, Switch | 12 position, rotary, make before break | Pulse selector switch |
| S-2, Switch | ON-OFF, toggle, 6 Amp. | Master switch |
| Heat Sink | 8 vane | Cooling |
| Term. Strip | 6 connector | Connect int/ext/wiring |
| Chassis | | Contains circuitry |

From the foregoing, the advantages of this invention are readily apparent. A closed fuel vaporization system has been provided for an internal combustion engine wherein liquid fuel droplets are injected into a vacuum chamber where they are immediately vaporized to form a gaseous fuel. No air is admitted into the system thereby minimizing the size vacuum pump needed to draw a sufficient vacuum to vaporize all of the fuel. This fuel is maintained at suitable temperature and introduced into the intake manifold of an internal combustion engine resulting in substantially greater fuel economy than was previously thought possible. A heat exchange system is provided utilizing the heated cooling fluid of the internal combustion engine as a heat exchange medium which heats the vacuum chamber, vacuum pump and associated fuel lines to reduce the vapor point of the gaseous fuel to minimize recondensation. A pressurized lubrication system is provided which lubricates the bearings of the rolling pistons as well as the piston walls and serves as a vapor seal between the moving parts within the cylinder. An electronic fuel control unit is provided which varies the number of firings of the coil to produce one fuel injection and adjust the length of that injection in response to the demands of the engine.

The invention has been described in detail with particular reference to a preferred embodiment thereof, but it will be understood that variations and modifications can be effected within the spirit and scope of this invention.

I claim:

1. A device for converting liquid hydrocarbon fuel to gaseous hydrocarbon fuel without distillation, said device comprising:
   a vacuum chamber closed to the atmosphere and having a single inlet and a single outlet;
   means for drawing a vacuum in said vacuum chamber through said outlet;
   means for injecting atomized liquid fuel without air into said chamber so that substantially all the injected fuel is immediately converted from a liquid state to a gaseous air-free state wherein said gaseous fuel is drawn by said vacuum means through said outlet; and
   a heat exchanger device having means for bringing hot fluid from an internal combustion engine into heat exchange relationship with the gaseous fuel in said vacuum drawing means and means for maintaining the gaseous fluid at a substantially constant temperature and in the gaseous state from said vacuum chamber to the intake manifold of said engine.

2. A fuel vaporization device for supplying gaseous fuel at subatmospheric pressure to an intake manifold of an internal combustion engine, said device including:
   a vacuum chamber closed to atmosphere which has a single inlet and a single outlet;

means for injecting only liquid fuel without air into said vacuum chamber through said inlet at a predetermined volume and rate;

a vacuum pump having an inlet and an outlet, said inlet of said vacuum pump being connected to said outlet of said vacuum chamber to draw a substantial vacuum therein to vaporize said liquid fuel into a gaseous state as it is injected into said vacuum chamber;

means for supplying the gaseous fuel to the intake manifold at subatmospheric pressure connected to the said outlet of said vacuum pump; and a heat device having means for bringing hot fluid from the internal combustion engine into heat exchange relationship with the gaseous fuel in said vacuum pump and into heat exchange relationship with said supply means for maintaining the gaseous fuel at substantially constant temperature and in the gaseous state from said vacuum chamber to the intake manifold.

3. A device, as claimed in claim 2, wherein: said hot fluid is liquid engine coolant.

4. A device, as claimed in claim 2, wherein said injecting means includes:

a fuel injector connected to said inlet of said vacuum chamber operable for injecting liquid fuel into said vacuum chamber;

means for supplying liquid fuel under pressure to said fuel injector from a source of liquid fuel; and a fuel control unit connected to said fuel injector and responsive to functions of the internal combustion engine for controlling the frequency and volume of liquid fuel injected into said vacuum chamber.

5. A device, as claimed in claim 2, wherein:
the vacuum drawn in said vacuum chamber is in the range of 22 to 25 inches of mercury at sea level.

6. A device, as claimed in claim 2, wherein:
the temperature of said gaseous fuel is kept in the range of 160° F. to 200° F.

7. A device, as claimed in claim 2, wherein:
said injecting means injects liquid fuel into said vacuum chamber in the form of liquid droplets.

8. A device, as claimed in claim 2, wherein said vacuum pump includes a rolling piston pump which comprises:

at least one cylinder, a crank shaft mounted coaxially within said cylinder for rotation;

a piston eccentrically mounted on said crank shaft and rotatable so that the piston wall rotates about the peripheral surface of the cylinder when the crank shaft is rotated;

a vane extending through said cylinder wall and being biased so that the edge thereof contacts the piston wall in a straight line contact to separate the cylinder into two sections;

bearings rotatably supporting said crank shaft for rotation within said cylinder;

a pressurized oil system supplying oil to said bearings and said piston walls in serial flow, wherein the oil also provides a seal between the piston walls and the cylinder walls and between said vane and said piston wall to provide substantially air tight chambers;

a passageway into a first bearing at one end of said crank shaft;

a passageway from said first bearing to said vanes; and a passageway from said cylinder to the bearing for the other end of said crank shaft.

9. A method of changing measured quantities of a liquid hydrocarbon fuel to a gaseous hydrocarbon fuel without distilling the liquid fuel, said method including the steps of:

providing a vacuum chamber with a single inlet and a single outlet;

drawing a vacuum in the vacuum chamber through said outlet by means of a vacuum pump;

injecting droplets of liquid fuel without air in measured quantities into the chamber while a vaccum is being drawn therein so that said droplets are immediately evaporated to form a gaseous, air-free fuel;

heating the vacuum pump by a heat exchanger which brings the gaseous fuel supply into heat exchange relationship with the heat source therein.

10. A method, as claimed in claim 9, including the further step of:

injecting the droplets in a plurality of injections at discrete, equally spaced time periods, each injection being of predetermined fixed duration.

* * * * *